July 26, 1932. F. G. PURINTON 1,868,804
MACHINE FOR ASSEMBLING AND COATING A MULTIPLICITY OF ARTICLES
Filed Dec. 9, 1926 7 Sheets-Sheet 1

Inventor.
Forrest G. Purinton
by Heard Smith & Tennant.
Attys.

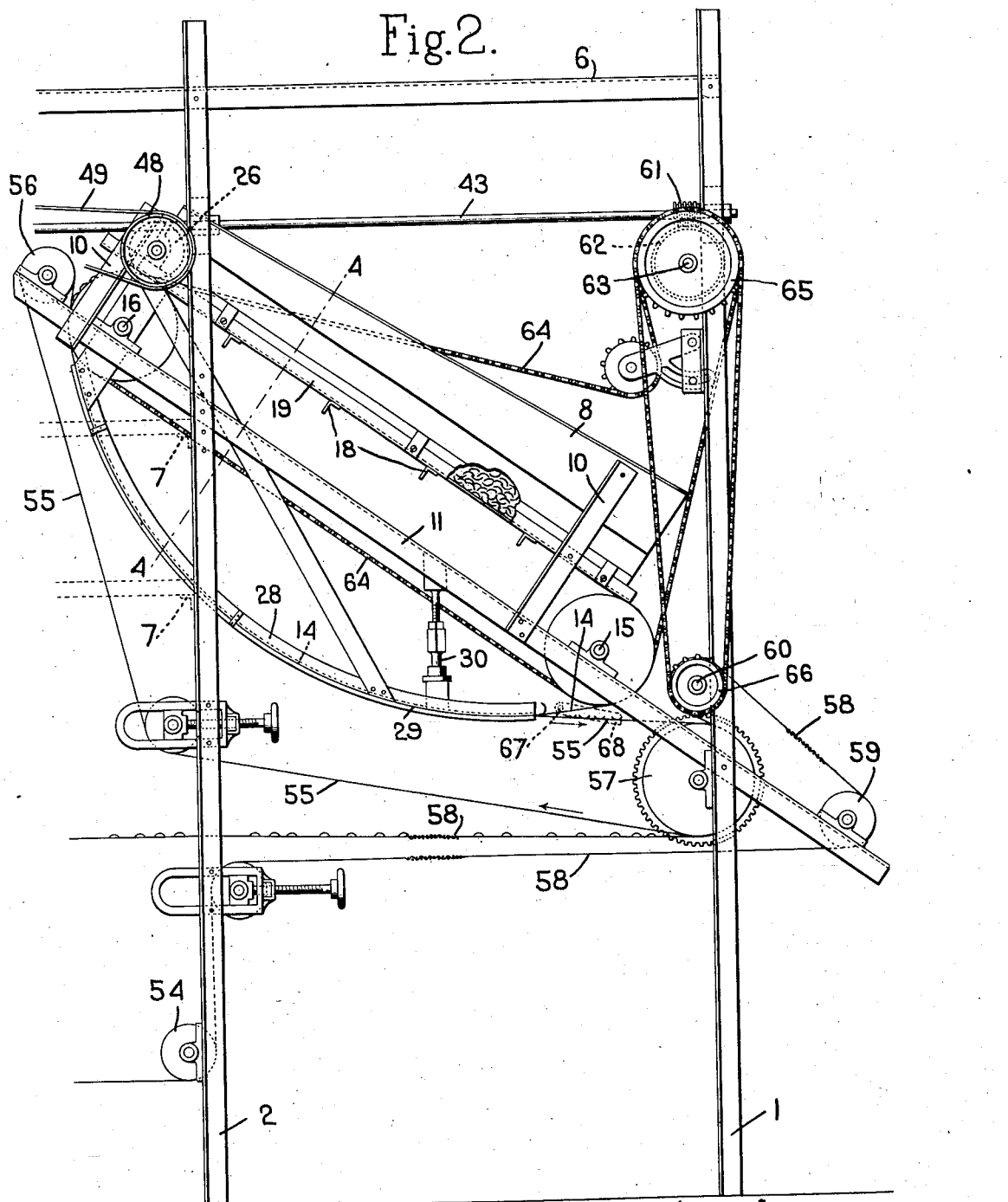

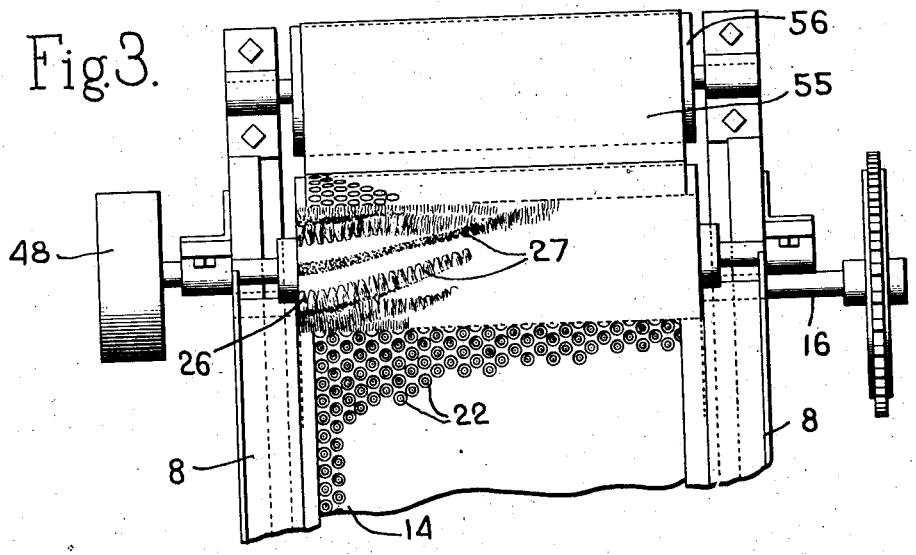
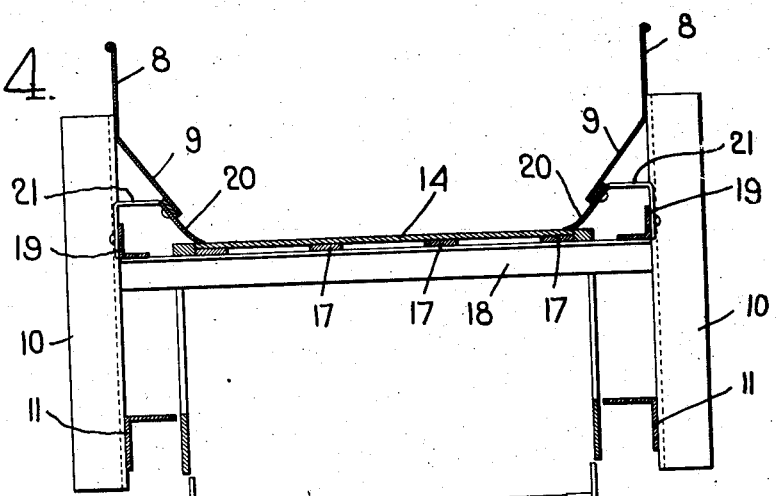
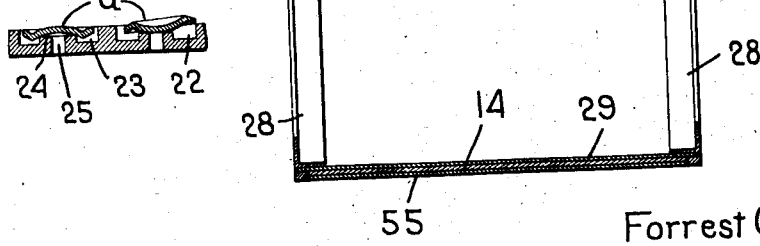

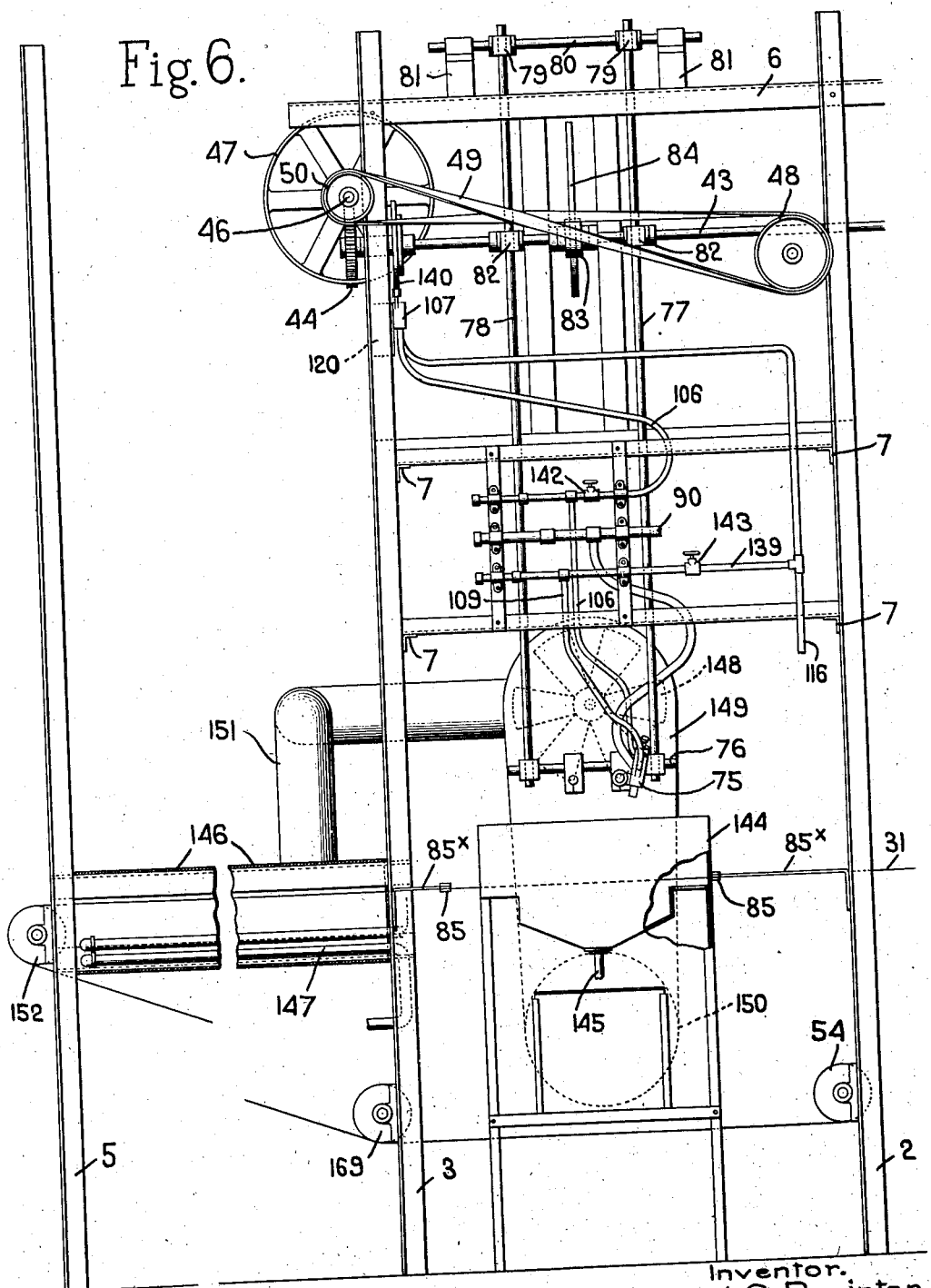

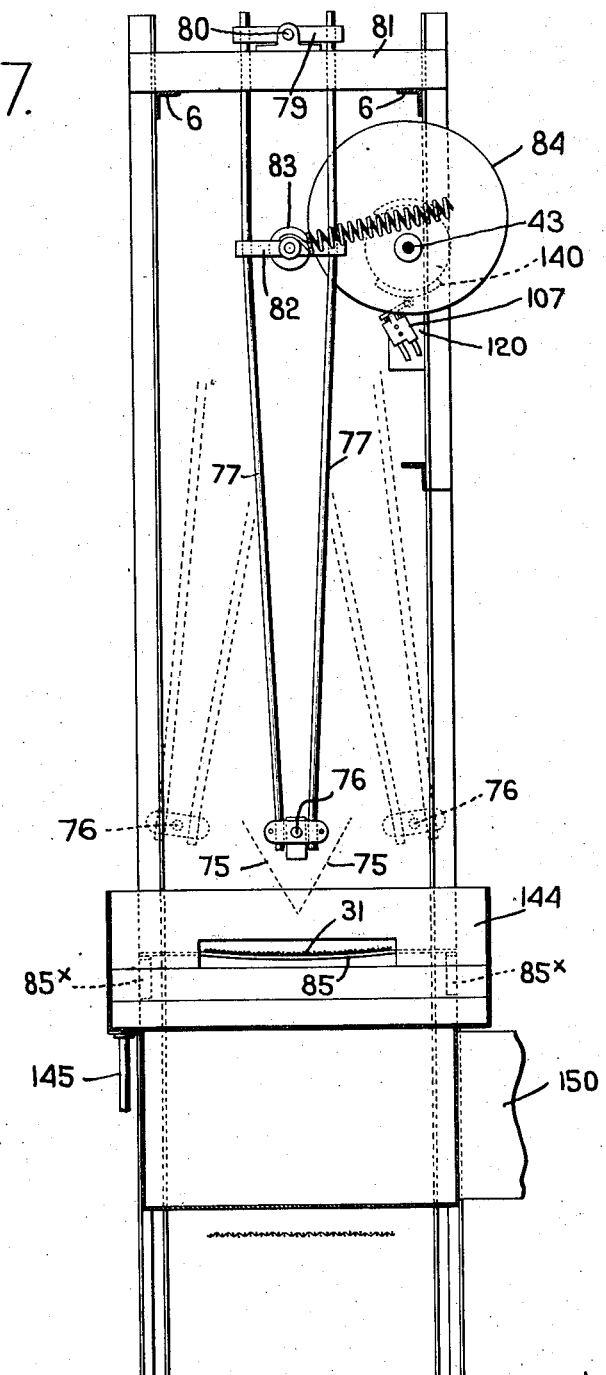

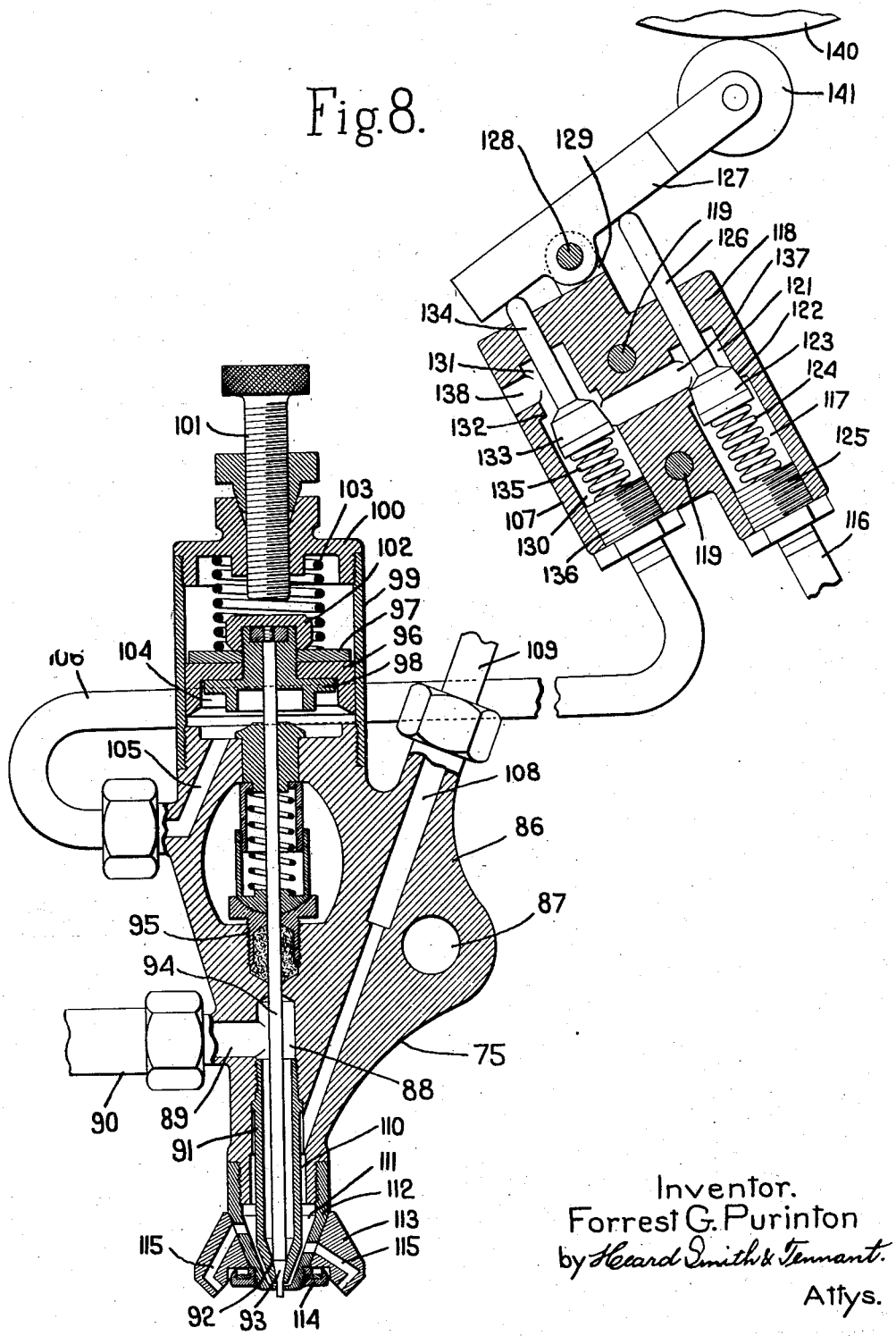

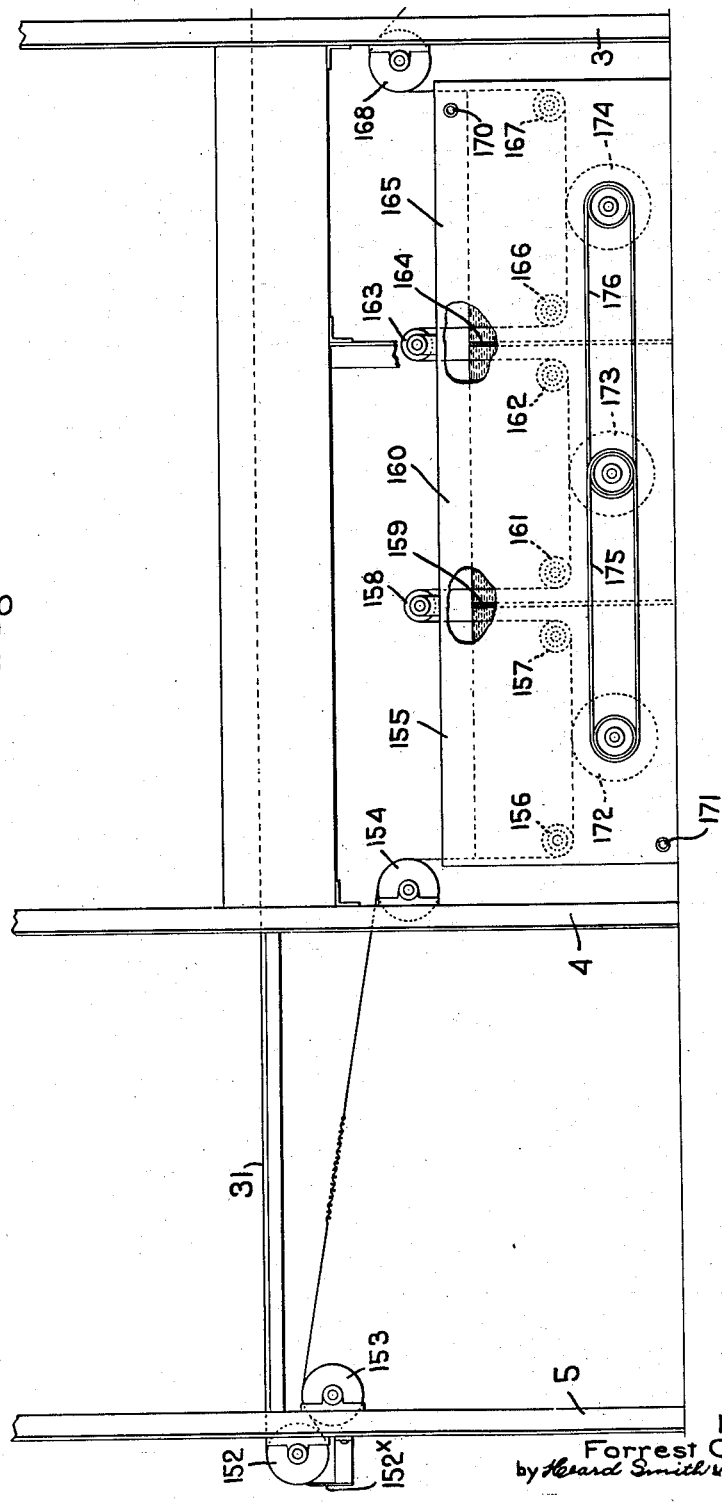

Patented July 26, 1932

1,868,804

UNITED STATES PATENT OFFICE

FORREST G. PURINTON, OF WATERBURY, CONNECTICUT, ASSIGNOR TO THE PATENT BUTTON COMPANY, OF WATERBURY, CONNECTICUT, A CORPORATION OF CONNECTICUT

MACHINE FOR ASSEMBLING AND COATING A MULTIPLICITY OF ARTICLES

Application filed December 9, 1926. Serial No. 153,512.

This invention relates to improvements in machines for assembling and coating, or otherwise treating, a multiplicity of articles.

An illustrative embodiment of the invention is disclosed herein as applied to machines for painting buttons, or like small articles, which have opposite faces of different contour. It will, however, be understood that the invention may be embodied in machines for assembling and for coating, or otherwise treating, other types of articles.

In the particular embodiment of the invention disclosed herein the buttons, or other articles, are placed in a hopper, the bottom of which comprises an endless travelling carrier provided with means, such as recesses, to receive and remove from a mass of articles deposited in said hopper only articles presenting faces in a predetermined position and to assemble them in closely separated juxtaposition. The assembled articles thus removed from the mass are then transferred, either directly or indirectly, from the assembling carrier to a travelling endless article-receiving conveyer which preferably is in the form of an endless wire screen which carries the articles assembled thereupon through the field of a reciprocating air brush or paint gun. The conveyer then carries the articles through a dryer in which the volatile solvents of the paint are driven off and the articles are then discharged from the conveyer. Preferably means are also provided for salvaging the coating material which is deposited upon the conveyer.

One of the objects of the invention is to provide mechanism for removing in narrowly separated juxtaposition similarly positioned articles from a mass thereof.

A further object of the invention is to provide a travelling conveyer to receive the assembled articles and to transport them to the means for treating the same.

A further object of the invention is to provide means for insuring the transfer of the articles from the assembling means to the conveying means without relative displacement of said articles. The conveying means desirably is in the form of an endless screen upon which the assembled articles are progressively deposited from a travelling carrier.

A further object of the invention is to provide a novel means for coating, or otherwise treating, the articles with a liquid composition in such a manner as to insure substantially uniform coating of all the articles upon the travelling conveyer. This is accomplished in the present invention by providing a spraying means for the fluid, such as a paint gun, with means for reciprocating the same transversely of the travelling endless conveyer at a uniform rate of movement throughout the width of the conveyer and a uniformly retarded movement from the edge of the conveyer to the point of reversal of movement and a constant increase of movement from the point of reversal to the edge of the conveyer from which the uniform traversing movement is continued. The uniformly retarded and uniformly increased movements of the spraying device beyond the edges of the conveyer may properly be designated as constant accelerations, from the edges of the conveyer to and from the position of reversal of movement of the spraying means, the term "acceleration" being thus used in its broad mechanical sense as including both posititve and negative acceleration.

A further object of the invention is to provide means for rendering the spraying device inoperative during the accelerated portions of the movement of said spraying means.

A further object of the invention is to provide pivotal means for suspending the spraying means, together with means for supporting the conveyer in such a manner that its transverse section will present an arc having substantially the same center as that of the arc through which the spraying device oscillates.

A further object of the invention is to provide means for removing the volatile solvent which is liberated by the spraying means and also by the drying device.

A further object of the invention is to provide means for salvaging such coating material as is deposited by the spraying means upon the endless conveyer.

An illustrative embodiment of the invention is shown in the accompanying drawings, in which, Fig. 1 is a side elevation of the mechanism for assembling the articles and transferring the same to an endless conveyer upon which they are subsequently treated;

Fig. 2 is a similar view of the assembling means provided with an intermediate article-receiving conveyer which transfers the assembled articles to the conveyer upon which the articles are treated;

Fig. 3 is a detail plan view of a portion of the assembling device and the means for preventing improperly positioned articles from being removed from the mass;

Fig. 4 is a vertical sectional view of the assembling mechanism on line 4—4 of Fig. 2;

Fig. 5 is a detail view of a portion of the assembling carrier showing one of the articles properly positioned thereupon and another article improperly positioned upon it;

Fig. 6 is a side elevation showing the spraying mechanism for applying paint, or other coating, to the assembled articles resting upon the conveyer and also illustrating the drier through which the conveyer passes after the articles are coated;

Fig. 7 is a transverse sectional view through the painting chamber, also illustrating diagrammatically the position of the pivotal support for the reciprocating or oscillating spraying device and the mechanism for actuating the same;

Figure 1:
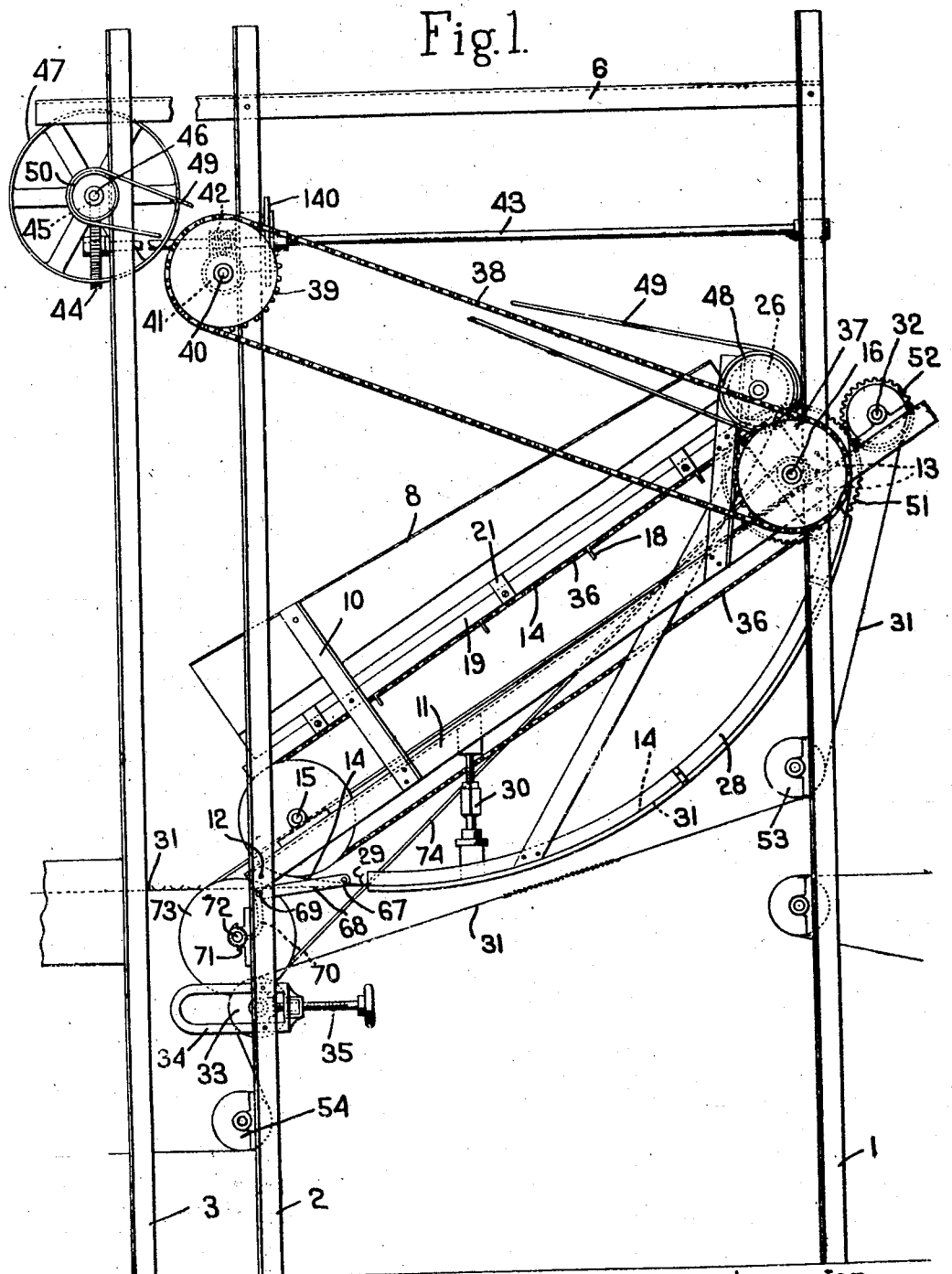

Fig. 8 is an enlarged detail view, mainly in section, of a preferred form of spraying device and the mechanism for controlling the same; and, Fig. 9 is a side elevation showing the conveyer passing through the drier and the means for directing the return lead of the conveyer through a series of tanks of solvent in which the material deposited upon the conveyer is salvaged, together with the brushes which aid in the salvaging operation.

The complete machine for painting buttons which is shown herein as an illustrative embodiment of the invention is of such length that it would be difficult, if not impossible, to show the entire machine in a single figure without too great a reduction. The sections of the machine are, therefore, illustrated which, when placed end to end, will disclose the entire mechanism.

Figs. 1 and 2 illustrate the assembling mechanism in which the buttons, or other articles, are selected from a mass in such a manner as to present the same faces of the buttons. That illustrated in Fig. 1 shows means for selecting the buttons from the mass and placing them in inverted position upon the conveyer which carries them through the painting field and thence through the drier. The mechanism illustrated in Fig. 2 is similar in all respects to that shown in Fig. 1 except that it comprises an additional article-receiving conveyer upon which the assembled articles are deposited in inverted position by the assembling carrier. The articles are then transferred from the article-receiving conveyer to the conveyer which carries them through the drying field and drier, but during this transfer are reversed to expose the obverse faces of the articles to the painting device.

The articles which have been assembled in one of the assembling devices, such as that illustrated in Fig. 1, and coated upon one side by the mechanism above generally described may be discharged from the end of the conveyer, after they have been dried, into the other assembling device, such as that illustrated in Fig. 2 and coated upon the other side in the same manner, or two separate machines may be employed and the articles discharged from one of the machines and transferred either automatically or manually to the assembling mechanism of the other machine as will be well understood by those skilled in the art.

It has, therefore, been deemed unnecessary to illustrate the identical portions of the mechanisms of the complete machine for coating both faces of the articles.

The frame of the machine comprises a series of pairs of uprights 1, 2, 3, 4 and 5 which are connected together longitudinally of the machine by suitable girders 6, the upper one of which is shown, to form side frames and these side frames are in turn connected together by suitable transverse girders, (not shown) to form a rigid supporting structure for all the mechanism. The uprights are provided with suitable brackets 7 to support other members of the construction.

*The assembling mechanism*

The assembling mechanism comprises an inclined hopper having side members 8 provided with downwardly converging lower portions 9 which are supported upon suitable posts 10, preferably of angle iron, upon girders 11 which, as illustrated in Fig. 1, are pivotally mounted at their lower ends upon a shaft 12 secured to or journalled in the posts 2. The upper ends of the base girders 11 are adjustably supported upon a rod or pins 13 which may be selectively mounted in any one of a series of holes in the uprights 1. A wall of the hopper, which as illustrated herein is the bottom, is formed by a travelling carrier 14, preferably of the endless belt type, which passes around suitable rollers the shafts 15 and 16 of which are mounted in suitable bearings carried by the base girder 11.

The upper lead of the travelling carrier 14 rests upon a series of plates 17 which are supported by transverse angle iron beams 18 which are connected to a side girder 19 of the hopper which extends in parallelism with the base girder 11 of the hopper at a distance therefrom. Desirably flexible members 20 of leather, canvas, or other suitable material, which are secured to suitable brackets 21 carried by the longitudinally extending girder 19 and to the inclined portions 9 of the sides of the hopper, rest upon the edges of the endless carrier and prevent articles in the hopper from spilling over the edge of the carrier, these members being employed to avoid abrasion or other injury to the travelling carrier.

The assembling carrier in the preferred form illustrated herein comprises an endless belt of heavy leather, the upper or grain surface of which is provided with a series of closely juxtaposed, but narrowly separated recesses 22 (see Figs. 3 and 5). These recesses, as illustrated herein, are provided with countersunk annular peripheral portions 23 leaving an upwardly extending central portion 24 which desirably is provided with a central aperture 25 to prevent articles deposited in the recesses from being held therein by suction. The recesses 22 thus formed are so shaped as to receive a button $a$ of a usual character with a central portion of its usually exposed face resting upon the upwardly extending central wall 24 of the recess, this upwardly extending portion desirably being of such height that when the button is properly positioned therein, as illustrated in the left side of Fig. 5, the back of the button will be substantially flush with the plane of the upper surface of the assembling carrier. This upwardly extending portion when engaged by the reverse face or back of the button, as illustrated at the right of Fig. 5, will hold the button above the plane of the upper surface of the assembling carrier so that the button will fall out of the recess, or if not may be removed from the recess by suitable doffing mechanism.

A desirable form of doffing mechanism, which is illustrated in Fig. 3, comprises a rotating brush 26 which desirably comprises a series of separated rows 27 of bristles, which it is found act more effectively to discharge the buttons than continuous rows of bristles. This brush is arranged at the upper end of a hopper and may be rotated by any suitable mechanism. The lower lead of the endless assembling carrier 14 desirably is permitted to sag to a considerable extent to co-operate with a suitable conveyer upon which the buttons, or other articles, are deposited from the assembling carrier. The lower lead of the assembling carrier is maintained taut and in intimate contact with the conveyer which receives the articles therefrom by an arc-shaped presser or guide comprising angle plates 28 having mounted thereupon a smooth plate 29 which engages the rear surface of the endless assembling carrier. This arcuate member serves, by pressing the article-receiving carrier against the travelling conveyer 31, to keep the buttons, or other articles, in their places in the recesses of the assembling carrier until the conveyer is in a horizontal position for not until then can the assembling carrier be removed without danger of causing or permitting the buttons to move out of their positions because of the inevitable vibrations which are present in the machine. The arcuate member preferably is so constructed as to present a convex surface having a uniform radius and the longitudinal tension in the conveyer 31 which engages the lower lead of the assembling carrier causes said conveyer to press against the buttons while in their recesses with a light uniform pressure.

The outer curved surface of the arcuate member starts as near as possible to the face of the pulley over which the assembling carrier extends and continues until the lower lead thereof is travelling in a substantially horizontal direction. By reason of this construction the buttons are transferred from the assembling carrier to the conveyer 31 by which they are carried through the painting field and preferably therebeyond to permit inspection of said articles. The lower end of this arcuate member or guide desirably is connected by turnbuckles 30 to the hopper frame so that it may be adjusted to insure proper engagement between the assembling carrier and the conveyer 31. The endless conveyer 31 is perforate and preferably is in the form of a wire screen of suitably coarse mesh to support the buttons and yet permit the greater portion of the paint which is not deposited upon the buttons to pass through it. The endless screen or conveyer 31, which is located in proximity to the upper drum of the endless carrier, is supported upon a shaft 32 which is mounted in suitable bearings carried by the base girders 11 which support the hopper. This endless assembled-article receiving carrier 31 engages the assembling carrier approximately in the vertical tangential plane in which the endless carrier passes over its upper roll and continues in contact with the under lead of the assembling carrier 14 until said conveyer 31 is in a substantially horizontal position from which it travels over suitable guides through the painting field and drier as will hereinafter more fully appear.

Suitable mechanism is provided for adjusting the tension upon the endless conveyer 31, such as a guide or tightening roll 33, the shaft of which is journalled in bearings which are slidably mounted in ways in a bracket 34 and adjusted by suitable hand screws 35.

Any desirable form of mechanism may be employed for driving the travelling endless carrier. As illustrated herein the carrier rolls are provided with suitable sprockets and are driven in unison by a sprocket chain 36. The upper driving roll of the endless carrier is provided with another sprocket 37 which is driven by a sprocket chain 38 from a sprocket wheel 39 upon a shaft 40 which has secured to it a worm gear 41 which is driven by a gear 42 upon the countershaft 43 which extends longitudinally of the machine and which in turn is driven by a worm gear 44 from the worm 45 upon the main driving shaft 46 which has upon it a pulley 47 which may be driven in any suitable manner as by a belt from a motor (not shown). The shaft of the brush 26 is provided with a band pulley 48 which is driven by a belt 49 from a complementary belt pulley 50 upon the shaft 46.

The endless conveyer 31 is actuated through co-operating gears 51 and 52 secured respectively upon the shaft 16 of the upper carrier drum and the shaft 32 of the drum which causes engagement of the conveyer and the lower lead of the travelling assembling carrier. Suitable guide pulleys 53 and 54 may be employed properly to direct the lower lead of the conveyer 31.

The construction shown in Fig. 2 is similar to that illustrated in Fig. 1 as aforesaid with the exception that a transferring carrier is provided to receive the buttons from the assembling carrier and to reverse the same and deposit them upon the conveyer which carries them through the painting field and drier. In this construction the transferring carrier comprises an endless belt 55, preferably of cotton webbing, which passes over a guide roll 56 the shaft of which is journalled in suitable bearings mounted upon the upper end of the base girders 11 of the hopper. The upper lead of the transferring belt 55 engages the lower lead of the assembling belt 14 in the same manner as aforesaid and passes at its lower end around a guide roller 57. The endless conveyer 58, upon which the articles are carried through the painting field and the drier, desirably is an endless wire screen of the character aforesaid and is carried around a suitable guide roller 59 the shaft of which is mounted in bearings upon the extended lower end of the hopper-supporting girders 11 and passes thence around a guide roller which is located above the guide roller 57 of the assembled-article receiving conveyer, the shaft 60 of which guide roller is journalled in suitable bearings (not shown) mounted upon the vertical standard 1. The conveyer 58 after passing around this guide roll engages the assembled-article receiving conveyer 55 and passes in contact therewith partially around the guide roller 57 for the article-receiving conveyer until the upper lead of the conveyer 58 assumes the substantially horizontal position in which it passes through the painting field and drier as aforesaid. In the operation, therefore, of the device illustrated in Fig. 2 the assembling carrier selects from the mass of buttons in the hopper only such buttons as enter the recesses face downwardly, the remaining buttons being brushed therefrom back into the hopper. The buttons in the loaded carrier are engaged by the upper lead of the article-receiving conveyer 55 during its movement in unison with the lower lead of said conveyer and are clamped firmly within said recess during the movement thereof along the guide 29. As the upper lead of the assembled-article receiving conveyer 55 reaches a substantially horizontal position and leaves its engagement with the lower lead of the assembling conveyer, the buttons are deposited upon the article-receiving conveyer 55 and carried by it in a substantially horizontal plane until they are engaged by the screen conveyer 58 upon which they are transported while still in assembled position through the painting field and the drier.

In this mechanism the articles are transferred from the assembling conveyer to the article-receiving conveyer 55 in inverted position, that is to say, with the faces uppermost, but upon transfer from the conveyer 55 to the endless screen conveyer are again reversed so that they rest upon the upper lead of the screen conveyer 58 with the backs uppermost which is in the reverse position to that in which the articles are delivered upon the endless screen conveyer 31 by the mechanism illustrated in Fig. 1.

In this construction a somewhat different power-transmitting mechanism is required to actuate the endless assembling carrier, the assembled-article receiving conveyer and the screen conveyer which transports the articles through the painting field and the drier. In this construction the countershaft 43 is provided with a worm 61 which engages a worm gear 62 upon a shaft 63 mounted in suitable bearings (not shown) carried by the upright of 1. The shaft 63 carries a plurality of sprocket gears, one of which drives a sprocket chain 64 which passes over a suitable sprocket wheel upon the shaft 16 of the upper guide roller of the article-assembling carrier, thence around the lower guide roller of the assembling carrier and returning to the sprocket wheel upon the shaft 63. Another sprocket wheel 65 upon the shaft 63 drives a sprocket chain which passes over a sprocket wheel 66 which is fixedly secured to the shaft 60 of the guide roll for the endless screen which is superimposed above the guide roll 57 of the article-receiving conveyer 55. Complementary gears upon the shaft 60 and upon the shaft of the lower guide roll for the article-receiving conveyer serve to drive the endless screen conveyer 58 in unison with said article-receiving conveyer.

In both of these constructions means desirably are provided to insure the discharge of the articles from the recesses in the assembling conveyer to the article-receiving conveyer. A preferred construction illustrated herein comprises a tappet rod 67 which extends across and slightly above the lower lead of the assembling conveyer 14 and is carried in the ends of arms 68 of a bell crank lever which is pivotally mounted upon a shaft or studs 69 in the uprights. The other arm 70 of said bell crank lever is engaged by tappet cams 71 which are secured to a shaft 72 which is provided with a pulley 73 which is driven by a belt 74 from a suitable pulley upon the shaft 16. A similar tappet rod and arm is diagrammatically illustrated in dotted lines in Fig. 2 and is actuated in a like manner.

It will thus be seen that the mechanism for assembling the buttons and transferring them to the conveyer which carries them through the painting field and the drier as illustrated in Figs. 1 and 2 are identical in construction except in that the construction illustrated in Fig. 2 includes an intermediate transferring belt for reversing the position of the buttons as they are deposited upon the endless screen conveyer and such change in the driving mechanism as may be required to actuate the several conveyers. Of course, each of the driving mechanisms is provided with suitable tightening devices.

Means are also provided to permit adjustment of the hopper for it is found that buttons having smooth surfaces will slip over each other more easily and consequently require a less inclination of the hopper to cause them properly to be engaged by the recesses in the assembling carrier than buttons which present rougher surfaces. It is found in practice that such inclination may be varied for the best operation on different buttons from twenty-five to forty degrees. The object of this adjustment is to provide such inclination as will permit the buttons being assembled properly to engage the recesses of the assembling carrier without requiring an excessive number in the hopper in which the mass of buttons should extend from the lower end of the hopper to, or nearly to, the brush at the top.

The assembled buttons, or other articles, to be coated are carried by the conveyers 31 and 58 respectively through a painting or coating field in which the paint, or other coating material, is sprayed upon the buttons by one or more "air brushes" or paint guns which are reciprocated transversely of the conveyer. Identical painting mechanism may be employed to coat the articles supported upon either of the conveyers 31 or 58. The description of one of such painting mechanisms, therefore, will be sufficient.

*The painting or coating mechanism*

One of the principal objects of the invention is to provide coating mechanism which will uniformly coat the buttons not only upon the exposed faces, but also upon the edges. This is accomplished in the present embodiment of the invention by pivotally supporting the air brush or brushes to swing through an arc above the travelling conveyer which supports the assembled articles and by providing means which will impart to the air brush or brushes uniform movements throughout the width of the conveyer and preferably constant accelerated movements from the edges of the conveyer to and from the points of reversal of the movement of the swinging air brushes, the term "accelerated" being employed in its mathematical or mechanical sense as indicating both positive and negative acceleration. Means are preferably also provided for rendering the air brushes inoperative during such accelerated movements in order to save the paint or other coating and also to permit the reversal of the movements of reciprocation of the air brush.

In the particular construction illustrated in the accompanying drawings, particularly in Figs. 6 and 7, one or more air brushes 75 are adjustably secured upon a bar 76 which extends longitudinally of the conveyer 31 and at a proper distance above the same and is supported upon hangers comprising pairs of rods 77 and 78 which are supported at their upper ends on cross heads 79 which are carried by a shaft 80 mounted upon a transverse girder 81 resting upon the upper girders 6. As illustrated in the drawings the upper portions of these bars are parallel and are connected at some distance below their supporting shaft by other cross heads or spacing bars 82 in which a shaft is mounted which carries a follower roller 83 which is engaged by a cam 84 which is fixedly secured upon the countershaft 43 and has a contour so designed as to impart a uniform motion to the air brushes throughout the width of the conveyer and a constant acceleration therefrom to the points of reversal of movement. The conveyer 31 (or 58) is supported fore and aft of the painting field upon arcuate guides 85 having the same center of curvature as that about which the air brush oscillates. These guides are supported by brackets 85x mounted upon the uprights of the main frame. By reason of this construction the spray from the air brush will be projected uniformly upon the exposed faces of the buttons. Any desirable number of air brushes may be employed and such air brushes desirably are so arranged as to project the spray at different angles both to the direction of movement of the conveyer and the direction of movement of the spraying means to insure complete coating of the edges of the articles.

Any suitable type of air brush or paint gun may be employed, mechanism desirably being employed to render the air brush inoperative during the accelerated movement of the brush as aforesaid. A preferred form of air brush mechanism and controlling mechanism therefor is illustrated in Fig. 8 of the drawings. This air brush comprises a body or head 86 of metal having an ear provided with an operture 87 to receive the supporting rod 76 of the hanger. The lower end of the head is bored axially to provide a chamber 88 into which the paint, or other coating material, is introduced through a port 89 which communicates with a conduit 90 leading to a receptacle containing the paint or other coating material. The paint in this receptacle desirably is maintained under pressure so that it will be forced into the chamber 88, or, of course, the paint supply may be supported at a sufficient height to permit it to flow into the chamber 88 by gravity. The lower portion of the walls of the chamber 88 are countersunk to receive a paint nozzle 91 provided with a tapered end portion 92 having a central outlet port. The flow of paint is controlled by a valve 93, of the needle valve type, the stem 94 of which extends through a suitable gland 95 and is connected at its upper end to the diaphragm or piston 96 of a pneumatically controlled valve. The piston 96 comprises a head and a co-operating plate 97 which clamp between them a suitable flanged ring or packing 98 which fits within a cylinder 99, the lower end of which is secured by a screw threaded engagement with the upper portion of the head. The upper end of the cylinder 99 is screw threaded and has connected to it a head 100 provided with a central boss having an aperture therethrough the walls of which are screw threaded to receive an adjusting screw 101 adapted to engage a cap nut 102 upon the end of the piston head which serves also to clamp the plate 97 upon the packing ring. A helical spring 103, interposed between the head 100 of the cylinder and the plate 97, tends to depress the piston and the needle valve which is connected thereto in such a manner as to close the outlet of the nozzle.

The piston is so located in the cylinder as to provide a chamber 104 therebeneath into which air under pressure may be introduced through a duct 105 from a pipe 106 leading to a suitable controlling mechanism 107 which will hereinafter be described. The body or head of the air brush is provided with a duct 108 into which air under pressure is admitted through a pipe 109. The duct leads from the pipe 109 to an annular recess 110 which communicates with a chamber 111 within a tapered nozzle member 112 which surrounds the paint nozzle 91. The nozzle 112 is provided with a tapered portion which extends in parallelism with and is slightly separated from the tapered portion of the paint nozzle 91. A sleeve 113, which is mounted upon the tapered portion of the air nozzle 112 and is held thereupon by a nut 114, is provided with a series of angularly arranged ducts 115 which communicate with the chamber 111 of the air nozzle and serve to direct jets of air transversely across the path of the jet of paint, thus aiding in the atomization and distribution of the paint which is delivered from the paint nozzle 91.

As heretofore stated, the air brush is carried at the lower end of an oscillating hanger which is given a uniform motion transversely of the conveyer 31 upon which the assembled buttons rest and a constant acceleration from the edge of the conveyer to the point of reversal of movement of the air brush and that means are provided for shutting off the supply of paint when the air brush passes beyond the edges of the conveyer. A preferred mechanism for automatically cutting off the supply of paint to the air brush and restoring such supply when the air brush again approaches the edge of the conveyer is illustrated particularly in Figs. 6 and 8 of the drawings. As shown in Figs. 6 and 8 of the drawings air under pressure is supplied from a suitable source through a pipe 116 to the chamber 117 of a controller which, as illustrated, comprises a block or casing 118 of metal which is secured by bolts 119 to a bracket 120 mounted on one of the standards 3. The upper wall of the chamber is countersunk to provide an extension 121 of said chamber 117 and to form a tapered valve seat 122 therebetween. A tapered valve 123 is normally held in engagement with the valve seat 122 by a helical spring 124 which abuts at one end against the bottom of said valve and at its other end against the nipple 125 which connects the pipe 116 to the block or casing 118. The valve 123 has a stem 126 which projects through the upper wall of the casing and is engaged by one arm of an actuating lever 127 which is pivotally mounted upon a shaft 128 carried by ears 129 which project upwardly from the upper end of the casing.

The casing 118 is provided with another chamber 130 which desirably extends in parallelism with the chamber 117 and is likewise counterbored to provide an extension 131 and a valve seat 132 for a valve 133. A valve stem 134 extends from the valve 133 through the upper end of the casing into engagement with the other arm of the lever 127. The lower end of the valve 133 is engaged by the upper end of a helical spring 135, the lower end of which is seated upon the nipple 136 which connects the pipe 106 to the casing 118 of the regulating device 107. A passage 137 leads from the extension 121 of the chamber 117 to the chamber 130 and an outlet port 138 leads from the extension 131 of the chamber 130 to the atmosphere.

The valve stems 126 and 134 are respectively of such lengths that when the valve 123 is seated, as illustrated in Fig. 8, the valve 133 will be held in open position, and vice versa when the valve 133 is seated the valve 123 will be held in open position. Thus it is apparent that with the valves in the position illustrated in Fig. 8 the passage of air under pressure from the pipe 116 through the regulating device will be prevented, whereas if the lever 127 be depressed the valve 123 will be opened, and the valve 133 closed, so that air will pass into the chamber 117, thence through the passage 137 to the chamber 130, the valve 133 being closed, and from the chamber 130 through the pipe 106 to the chamber 104 beneath the piston or diaphragm which is connected to the valve stem 94, thereby raising the needle valve and permitting the flow of paint through the paint nozzle.

Atomizing air under pressure is introduced into the pipe 109 through a header 139 which communicates with the compressed air inlet pipe 116 so that the paint issuing from the paint nozzle is vaporized by the air under pressure issuing through the port of the air nozzle and also through the ducts 115 which also direct atomizing jets of air upon the paint discharged from the paint nozzle.

As heretofore stated it is desirable to shut off the supply of paint to the air brush during the accelerated motion of the air brush after it has passed the edges of the conveyor upon which the assembled articles are carried. The mechanism for accomplishing this purpose illustrated in the accompanying drawings comprises a cam 140 which is fixedly secured upon the counter shaft 43 upon which the cam 83, which oscillates the air brush, is mounted. By reason of the fact that the cams 85 and 140 are mounted upon the same shaft absolute synchronism of rotation is established. The cam 140 engages a cam follower wheel 141 which is rotatably mounted upon the end of the lever 127 and the cam 140 is so formed as to depress the lever 127 to open the valve 123 and close the valve 133 at the time the air brush is directed at an edge of the conveyor 31 and to maintain the valve 123 in such depressed condition during the uniform movement of the air brush across the conveyor. Simultaneously with the opening of the valve 123 the valve 133 will be closed and air under pressure will pass from the pipe 116 through the chamber 117 of the regulator, thence through the passage 137 and chamber 130 into the pipe 106 from which it passes beneath the piston 96, thereby raising the needle valve against the pressure of its spring and permitting the paint to flow from the nozzle. The cam 140 is also so formed that as soon as the air brush passes beyond the other edge of the conveyer the lever 127 will be permitted to rise, thereby depressing the valve 133 and simultaneously permitting the valve 123 to close so that air under pressure is prevented from passing through the aperture 137 in the regulator. The opening of the valve 133 immediately permits the escape of air under pressure from the pipe 106 through the chamber 130, its extension 131, and port 138, thereby permitting the spring 132 to close the needle valve upon its seat and shut off the supply of paint until the cam 140 again depresses the lever 127 to re-establish communication with the chamber beneath the piston upon the needle valve stem when the air brush again approaches the edge of the belt at the completion of the accelerated movement of said air brush. By virtue of this construction the paint, or other coating material, is sprayed upon the articles upon the carrier with uniformity and wastage of paint during the accelerated movements of the air brush is prevented. The action of the needle valve also serves to keep the paint nozzle clear.

While the construction has been described above as comprising only a single air brush, it will be readily understood that a plurality of air brushes may be employed, and as illustrated herein the pipe 106 leading from the regulator to the air brush and the pipe 90 leading to the chamber of the paint nozzle may be constructed in the form of headers from which similar pipes may be led to other like air brushes.

Desirably reducing valves 142 and 143 are provided in the pipes 106 and 139 which convey air under pressure to the air brush in order that the pressure in the valve chamber and also the atomizing pressure may be properly regulated. A suitable receptacle 144 encloses the section of the conveyer as it passes through the painting field and collects such paint as passes through the meshes of the conveyer and beyond the edges thereof. This receptacle desirably is provided with a suitable outlet pipe 145 through which the paint deposited in the receptacle may be removed by a proper solvent.

*The drier*

The conveyer 31 passes from the painting field through a drier which, as illustrated herein, comprises a closed casing 146 which is supported upon suitable girders from the uprights of the frame and in which steam pipes 147 are arranged preferably longitudinally thereof.

Desirably means are provided for conducting away the volatile gases from the drier and from the painting field. This is accomplished in the present invention by a fan 148 which is located within a casing 149 with pipes 150 and 151 leading respectively from a chamber beneath the painting field and from the drier to the eye of the fan, with a suitable discharge pipe (not shown) leading from the fan out of the room in which the apparatus is located.

The articles are discharged from the conveyer as it passes around the roller 152 by a doffer 152x and may be deposited in a suitable receptacle. Preferably the complete machine, however, is formed in two sections, one of which embodies the assembling and transferring mechanism illustrated in Fig. 1 and the other the assembling mechanism illustrated in Fig. 2. As it is desirable to coat the backs of buttons first the first section of the machine is provided with the assembling mechanism shown in Fig. 2 and the buttons are delivered from the endless screen conveyer of this machine into the assembling hopper of the second section which is of the construction illustrated in Fig. 1. Desirably the endless conveyer in the latter section is extended a sufficient distance beyond the end of the drier to enable the buttons to be inspected before they are discharged from the conveyer.

Paint salvaging

It is inevitable in painting or coating buttons, or like articles, that a considerable amount of the paint, or other coating material, is deposited upon and adheres to the endless conveyer which transports it through the painting field and the drier. Another feature of the invention relates to means for salvaging the paint or other coating material. This is accomplished by passing the lower lead of the conveyer, after the articles have been discharged therefrom, through a tank, or series of tanks, containing a solvent for the paint, or other coating material, and preferably also providing means located within the solvent and engaging the conveyer to aid in dislodging the paint or coating material from the conveyer. In the particular construction illustrated the lower lead of the conveyer 31 or 58 passes over idle rollers 153 and 154 into the liquid in the first section 155 of a tank. The conveyer is guided well beneath the surface of the tank by a pair of idle rollers 156 and 157 from the latter of which it passes upwardly over a roller 158 which desirably is mounted directly above a partition 159 dividing the first section 155 of the tank from the second section 160 thereof. The conveyer again passes beneath the liquid in the section 160 and is conducted by rollers 161 and 162 through the liquid in the tank. From the roller 162 the conveyer is carried upwardly over a roller 163 which is mounted directly above the partition 164 separating the section 160 of the tank from the section 165. The conveyer passes from the roller 160 beneath two rollers 166 and 167 and thence upwardly over a roller 168 from which it passes beneath suitable guide rollers 169 to the idle roller 54 which is carried by the uprights 2 and from which the lead is directed by suitable guide rollers to the end roller which is located in proximity to the endless assembling carrier as heretofore described.

The partitions 159 and 164 between the sections 155, 160 and 165 respectively of the tank extend from the bottom of the tank only part-way to the top thereof so that a solvent liquid may be introduced through an inlet pipe 170 in the tank 165 which is the last of the series and will flow progressively into the section 160 and from that section into the section 155, a suitable outlet 171 being provided to permit the liquid to be drawn off from the section 155 as rapidly as it is introduced through the inlet pipe 170.

By reason of this construction fresh solvent may be continuously introduced into the tank 165 and plain-laden solvent withdrawn from the outlet 171. This paint-laden solvent may be mixed with other paint and again used.

In order to facilitate removal of paint from the screen rotating brushes 172, 173 and 174 may be located within the respective sections 155, 160 and 165 of the salvaging tank with shafts projecting through the wall of the tank having suitable pulleys which may be driven by belts 175 and 176 from a suitable source of power (not shown).

In the operation of the machine the buttons, or other articles, to be painted or coated are supplied en masse in one of the hoppers, as illustrated in Fig. 1 or Fig. 2. The travelling assembling carrier selects therefrom articles which are positioned face downwardly, while improperly positioned articles are discharged from the assembling carrier by the rotating spiral brush at the upper end of the hopper. The buttons are then transferred from the assembling carrier to an assembled-article receiving conveyer which, as illustrated in Fig. 1, may be an endless conveyer arranged to carry the assembled articles through the painting field and the drier, or the assembling carrier may deliver the articles to an intermediate assembled-article receiving carrier, as illustrated in Fig. 2, from which they are again transferred in reversed position to the carrier 58 which, as heretofore stated, is identical in construction with the carrier 31, and which also is arranged to carry the articles through the painting field and a drier. In either case as the articles pass through the painting field they are sprayed with paint, or other coating material, by the reciprocating air brush which, by reason of its uniform oscillating movement throughout the width of the conveyer, applies the paint uniformly to the exposed faces and edges thereof—particularly as the carrier is supported in such a manner as to present a transverse arc substantially concentric with the arc of movement of the air brush. From the painting field the conveyer passes through the drier and the articles are discharged during the passage of the conveyer over the final guide roll. The under or return lead of the conveyer is passed progressively through a series of sections of a tank containing a solvent for the paint, or other coating material, so that the conveyer is cleaned progressively during its return to loading position. When the buttons or other articles have been coated upon one side in the manner aforesaid they may be reassembled and coated upon the other side by similar mechanism in the manner above described.

By reason of this construction a great saving in labor is accomplished over any other machine or apparatus for coating buttons or like articles; the articles are painted or coated more uniformly and with less wastage as the coating thus uniformly applied is less apt to fill the eyes of the button or to accumulate unevenly upon the button than in processes heretofore employed. Furthermore, a large saving is made in the conservation of paint by virtue of the intermittent operation of the air brushes, and further saving is accomplished in the salvaging of paint from the conveyer.

It will be understood that the particular embodiment of the invention disclosed herein is of an illustrative character and is not restrictive, and that various changes in form, construction and arrangement of parts may be made within the spirit and scope of the following claims.

Having thus described the invention, what is claimed as new, and desired to be secured by Letters Patent, is:

1. In a machine for coating a multiplicity of articles comprising a hopper, a travelling carrier passing therethrough having means for assembling in narrowly separated juxtaposition articles presenting like faces, from a mass of said articles, a travelling conveyer arranged progressively to receive the assembled articles therefrom in reversed position but in the same juxtaposition and pressure-actuated means for spraying liquid coating material upon said articles during the travelling movement of said conveyer.

2. In a machine for coating a multiplicity of articles comprising a hopper, a travelling carrier passing therethrough having means for assembling in narrowly separated juxtaposition articles presenting like faces, from a mass of said articles, a travelling conveyer arranged progressively to receive the assembled articles therefrom in reversed position but in the same juxtaposition, pressure-actuated means for spraying liquid coating material upon said articles during the travelling movement of said conveyer, means for progressively drying the coated articles while on said travelling conveyer and means for salvaging, after the articles have been removed, the coating material deposited upon said conveyer.

3. In a machine for coating a multiplicity of articles comprising a hopper, a travelling endless carrier passing therethrough having means for assembling in narrowly separated juxtaposition articles presenting like faces from a mass of said articles, a travelling endless perforate conveyer arranged progressively to receive the assembled articles, spraying means for projecting a plurality of jets of liquid coating material angularly in relatively different directions upon the articles supported upon said travelling conveyer and means for reciprocating said spraying means transversely of the direction of movement of said conveyer, whereby the edges, as well as the exposed faces of said articles, will be coated.

4. In a machine for coating a multiplicity of articles, a travelling endless carrier having means for assembling in narrowly separated juxtaposition articles presenting like faces from a mass of said articles, a travelling endless perforate conveyer engaging said travelling endless carrier and arranged progressively to receive the assembled articles therefrom, spraying means for projecting liquid coating material upon the articles supported upon said travelling conveyer, means for imparting to said spraying means a reciprocating uniform movement transversely of the direction of movement of said conveyer throughout the width of said conveyer to insure substantially uniform coating of said articles and means for rendering the spraying means inoperative during the reversal of the movement thereof.

5. In a machine for coating a multiplicity of articles, a travelling endless carrier having means for assembling in narrowly separated juxtaposition articles presenting like faces from a mass of said articles, a travelling endless perforate conveyer engaging said travelling endless carrier and arranged progressively to receive the assembled articles therefrom, spraying means for projecting liquid coating material upon the articles supported upon said travelling conveyer, means for reciprocating said spraying means transversely of said conveyer a distance greater than the width of said conveyer including means for causing a uniform movement of said spraying means throughout the width of the conveyer and a constant acceleration from the respective edges of the conveyer to and from the position of reversal of movement.

6. In a machine for coating a multiplicity of articles, a travelling endless carrier having means for assembling in narrowly separated juxtaposition articles presenting like faces from a mass of said articles, a travelling endless reticulated conveyer engaging said travelling endless carrier and arranged progressively to receive the assembled articles therefrom, spraying means for projecting liquid coating material upon the articles supported upon said travelling conveyer, means for reciprocating said spraying means transversely of said conveyer a distance greater than the width of said conveyer including means for causing a uniform movement of said spraying means throughout the width of the conveyer and a constant acceleration from the respective edges of the conveyer to and from the position of reversal of movement and means for automatically rendering the spraying means inoperative during the accelerated movements of said spraying means.

7. In a machine for coating a multiplicity of articles, a travelling endless carrier having means for assembling in narrowly separated juxtaposition articles presenting like faces from a mass of said articles, a travelling endless reticulated conveyer engaging said travelling endless carrier and arranged progressively to receive the assembled articles therefrom, spraying means for projecting liquid coating material upon the articles supported upon said travelling conveyer, means for reciprocating said spraying means transversely of said conveyer a distance greater than the width of said conveyer including means for causing a uniform movement of said spraying means throughout the width of the conveyer and a constant acceleration from the respective edges of the conveyer to and from the position of reversal of movement and means including a pneumatically controlled valve automatically operable to prevent the delivery of coating material from said spraying means during the accelerated movements of said spraying means.

8. In a machine for coating a multiplicity of articles comprising an endless conveyer for said articles, an air brush suspended above said conveyer having a nozzle provided with an outlet for the coating liquid, means for supplying liquid thereto, means for delivering an atomizing jet of air under pressure upon the liquid delivered from said outlet, means for supplying air under pressure thereto, a pneumatically controlled valve for said liquid outlet, means for supplying air under pressure to said valve, means for reciprocating said air brush transversely of said conveyer and means for automatically controlling the delivery of air under pressure to said pneumatically controlled valve operable to cause the delivery of liquid from said nozzle only during predetermined portions of the reciprocating movements of said air brush.

9. In a machine for coating a multiplicity of articles comprising an endless conveyer for said articles, an air brush pivotally suspended to swing transversely of said conveyer and having a nozzle provided with an outlet for the coating liquid, means for supplying liquid to said nozzle, means for delivering an atomizing jet of air under pressure upon the liquid delivered from said outlet, means for supplying air under pressure, a pneumatically controlled valve for said outlet having a spring tending to close said valve, a conduit for delivering air under pressure from said air-supplying means to said pneumatic valve in opposition to said spring to open said valve, means for reciprocating said air brush transversely of said conveyer and valves in said conduit automatically operable in synchronism with the transverse movement of said air brush to cut off the supply of air under pressure to said pneumatic valve and to release the air therefrom at substantially the points where the air brush passes beyond the edges of said conveyer.

10. In a machine for coating a multiplicity of articles comprising an endless conveyer for said articles, an air brush pivotally suspended to swing transversely of said conveyer and having a nozzle provided with an outlet for the coating liquid, means for supplying liquid to said nozzle, means for delivering an atomizing jet of air under pressure upon the liquid delivered from said outlet, means for supplying air under pressure, a pneumatically controlled valve for said outlet having a spring tending to close said valve, a conduit for delivering air under pressure from said air-supplying means to said pneumatic valve in opposition to said spring to open said valve, means including a cam operable to reciprocate said air brush with a uniform movement throughout the width of said conveyer and a constant acceleration from the respective edges of the conveyer to and from the position of reversal of movement, valves in the conduit leading to the pneumatic valve operable by a cam rotating in unison with the air brush-actuating cam operable to cut off the supply of air under pressure to said pneumatic valve and render the same inoperative during the accelerated movements of said air brush and to restore air pressure to said pneumatic valve during the uniform movements of said air brush.

11. A machine for coating a multiplicity of articles comprising a travelling flexible endless conveyer supporting said articles, an air brush pivotally suspended to swing transversely of the direction of movement of said conveyer, means for causing uniform speed of movement of said air brush throughout the width of said conveyer and means for supporting said conveyer to cause the article-supporting lead thereof to present a curved surface substantially concentric with the arc of movement of said air brush whereby uniform coating of all the articles upon the conveyer will be insured.

12. In a machine for coating a multiplicity of articles comprising a travelling endless perforate conveyer to receive the articles, spraying means for projecting liquid coating material upon the articles supported upon said travelling conveyer, means for imparting to said spraying means a reciprocating uniform speed of movement transversely of the direction of movement of said conveyer throughout the width of said conveyer, to insure substantially uniform coating of said articles and reversely accelerated movements beyond each of the edges of the conveyer to and from the positions of reversal of the direction of movement of said spraying means.

13. In a machine for coating a multiplicity of articles, a travelling endless perforate conveyer to receive said articles, spraying means for projecting liquid coating material upon the articles supported upon said travelling conveyer, means for reciprocating said spraying means transversely of said conveyer a distance greater than the width of said conveyer, including means for causing a uniform movement of said spraying means throughout the width of the conveyer, and a constant acceleration from the respective edges of the conveyer to and from the position of reversal of movement.

14. In a machine for coating a multiplicity of articles, a travelling endless perforate conveyer to receive said articles, spraying means for projecting liquid coating material upon the articles supported upon said travelling conveyer, means for reciprocating said spraying means transversely of said conveyer a distance greater than the width of said conveyer, including means for causing a uniform movement of said spraying means throughout the width of the conveyer, and a constant acceleration from the respective edges of the conveyer to and from the position of reversal of movement, and means for automatically rendering the spraying means inoperative during the accelerated movements of said spraying means.

15. In a machine for coating a multiplicity of articles, a travelling endless perforate conveyer to receive said articles, spraying means for projecting liquid coating material upon the articles supported upon said travelling conveyer, means for reciprocating said spraying means transversely of said conveyer a distance greater than the width of said conveyer, including means for causing a uniform movement of said spraying means throughout the width of the conveyer, and a constant acceleration from the respective edges of the conveyer to and from the position of reversal of movement, and means including an automatically operable valve for preventing the delivery of coating material from said spraying means during the accelerated movements of said spraying means.

In testimony whereof, I have signed my name to this specification.

FORREST G. PURINTON.